United States Patent
Patil et al.

(10) Patent No.: US 11,316,726 B2
(45) Date of Patent: Apr. 26, 2022

(54) CALIBRATION FOR MISMATCH IN RECEIVER CIRCUITRY WITH MULTIPLE SAMPLERS

(71) Applicant: Intel Corporation, Santa Clara, CA (US)

(72) Inventors: Dinesh Patil, Sunnyville, CA (US); Jihong Ren, Cupertino, CA (US); Reza Navid, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 16/020,771

(22) Filed: Jun. 27, 2018

(65) Prior Publication Data

US 2020/0007379 A1 Jan. 2, 2020

(51) Int. Cl.
*H04L 27/38* (2006.01)
*H04L 27/36* (2006.01)

(52) U.S. Cl.
CPC ........ *H04L 27/3863* (2013.01); *H04L 27/366* (2013.01)

(58) Field of Classification Search
CPC .................................................. H04L 27/3863
USPC ...................................................... 375/322
See application file for complete search history.

(56) References Cited

U.S. PATENT DOCUMENTS

| 4,094,307 | A | * | 6/1978 | Young, Jr. | ............ | A61B 5/4094 |
| | | | | | | 600/544 |
| 7,792,187 | B2 | | 9/2010 | Bulzacchelli | | |
| 10,135,604 | B1 | * | 11/2018 | Dehlaghi | ............ | H04L 7/0334 |
| 2005/0093625 | A1 | * | 5/2005 | Khlat | ............ | H03G 3/3047 |
| | | | | | | 330/129 |
| 2009/0310667 | A1 | * | 12/2009 | Lee | ............ | H03L 7/091 |
| | | | | | | 375/233 |
| 2012/0027074 | A1 | * | 2/2012 | Raghavan | ............ | H04L 25/10 |
| | | | | | | 375/233 |
| 2014/0169440 | A1 | * | 6/2014 | Kotagiri | ............ | H04L 25/063 |
| | | | | | | 375/233 |
| 2016/0065394 | A1 | * | 3/2016 | Sindalovsky | ..... | H04L 25/03012 |
| | | | | | | 375/371 |

* cited by examiner

*Primary Examiner* — Lihong Yu
(74) *Attorney, Agent, or Firm* — Fletcher Yoder, P.C.

(57) ABSTRACT

Receiver circuitries having multiple branches, such as unrolled feedback equalizers and fractional-rate receivers, may present differences between filtering elements of different branches with common filter inputs. Embodiments include devices capable of calibration that compensates such differences. The devices may be capable of introducing front-end offsets to emphasize the mismatches, and sweep filter input values to calculate the mismatches, and introducing offsets in the branches to compensate for the mismatches. Methods for use of the calibration devices are also described.

20 Claims, 9 Drawing Sheets

CALIBRATION FOR MISMATCH IN RECEIVER CIRCUITRY WITH MULTIPLE SAMPLERS

BACKGROUND

This disclosure relates to receiver circuitry and, more specifically, to calibration systems and methods for receiver and decoder circuitry with multiple branches, such as unrolled feedback equalizers and fractional-rate receiver circuitry with multiple samplers.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electrical and electronic devices include circuitry that may be used to transmit and receive information. For example, electronic devices that are communicatively coupled via a digital serial data connection may have transceivers that may access and control the physical medium that carries the information. To that end, a receiver in an electronic device coupled to the digital serial data connection may include circuitry that receives an analog electrical signal and decodes (e.g., converts) the received analog signal into a digital signal. The digital signal may be further processed in the electronic device.

The analog electrical signal in the physical medium may be affected by noise, distortion, and/or interference during data transmission. The distorted analog signal may receive corrections (e.g., filtering, equalization, amplification) in the receiver circuitry to improve the quality of the decoded digital signal. Moreover, the data rate (e.g., data transmission frequency) may be higher than a frequency of the digital circuitry in the receiver. To process the incoming data end, receiver circuitry may include multiple samplers in branches of processing, such as in fractional-rate decoders (e.g., half-rate and/or quarter rate decoders) and in unrolled filter implementations. Differences in electrical characteristics in the components in the branches of these circuits may lead to signal processing mismatches that can affect link sensitivity and/or data quality. As transmission distances, processing speed, and/or bandwidth requirements increase, improvements in the reception quality of the signal transmission between electronic devices may be beneficial.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
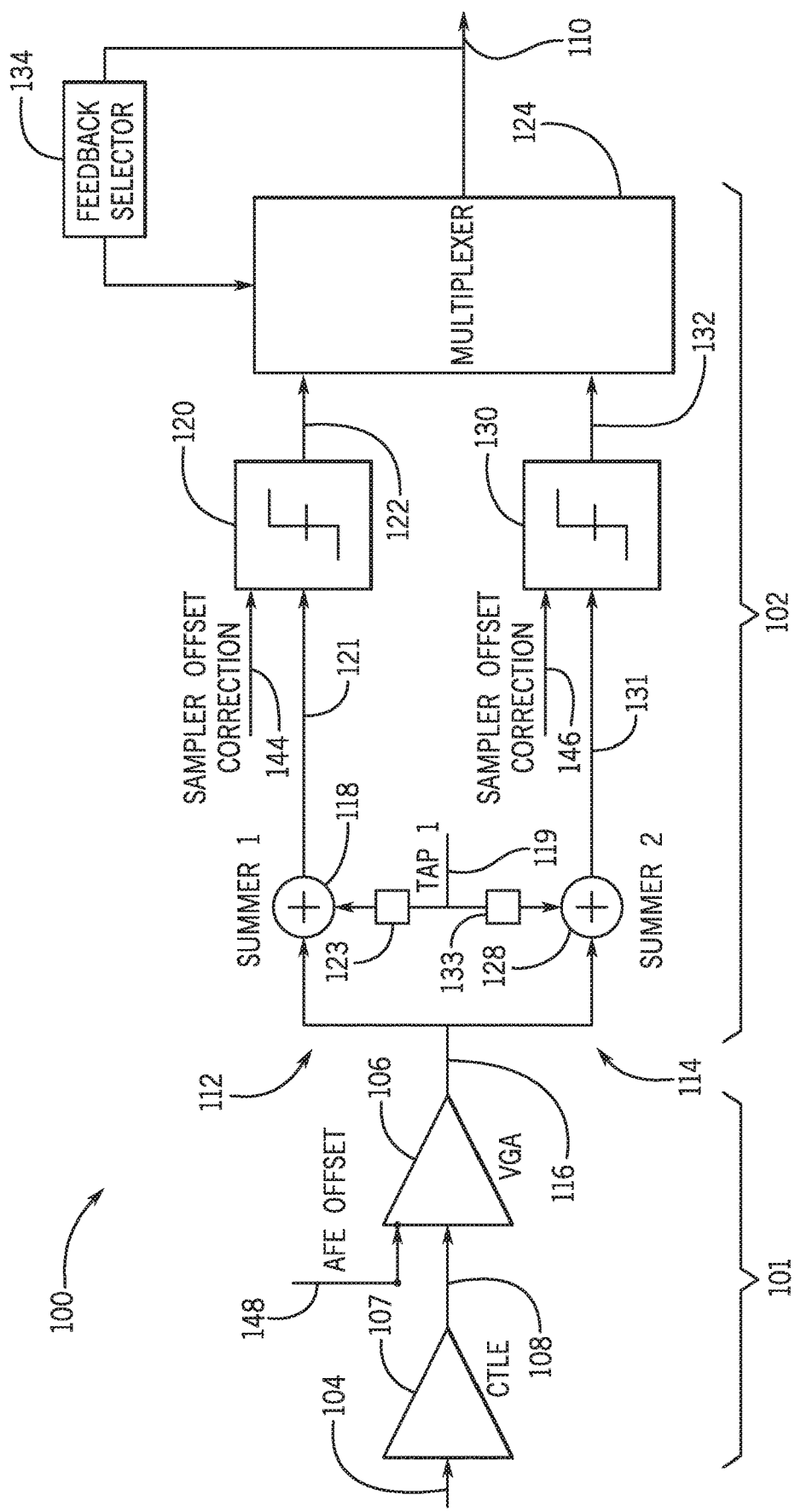
FIG. 1 is a diagram of receiver circuitry having a decision feedback equalizer (DFE) with multiple samplers and calibration circuitry, in accordance with an embodiment.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Several electrical or electronic systems may employ transceivers, receivers, and/or transmitters to establish communication with other electronic devices. For example, to establish serial and/or parallel digital communication between electronic devices, a transmitter may include encoders that may convert (e.g., encode) a digital signal (e.g., a binary data stream) into an analog signal. The analog signal may be transmitted through a physical communication channel (e.g., a wire, an optic fiber, a wireless radiofrequency channel) from the first to a receiver in the second electronic The receiver may include a decoder that may convert the received analog signal into a digital data stream, that may be further processed in the second electronic device.

The decoder in the receiver circuitry may include multiple samplers that may operate in parallel branches. For example, a receiver circuitry may have samplers operating at a clock rate that may be a fraction (e.g., half, a quarter) of the clock rate of the analog signal. For example, receiver circuitry may receive a 1 GHz signal and have two parallel samplers, each one in a dedicated branch, each operating at 500 MHz, and each configured to capture distinct phases of the incoming analog signal. In another example, receiver circuitry may have multiple samplers in parallel with each sampler configured to capture a different characteristic of the incoming analog signal (e.g., edge crossing sampler, the data sampler, the eye height monitor, the roaming eye-opening sampler).

In some systems capable of decoding multi-level signals (e.g., multi-level pulse amplitude modulation or PAM-N), the receiver may have multiple samplers in parallel branches in which each sampler may have a different voltage level. For example, a 4-level pulse amplitude modulation (PAM-4)

decoder may have three branches in which each branch compares the analog signal with a different reference level (e.g., a positive reference value, a negative reference value, and a null reference value). The sampled bits from each branch may be provided to a ternary-to-binary decoder, which may produce a binary bit sequence using the PAM-4 encoding/decoding rules.

Moreover, multiple branches may be used to implement unrolled filters and/or equalizers. The analog signal may be distorted in the communication channel, during the transmission. In order to restore the signal quality and improve transmission efficiency, the receiver may include filters and/or equalizers to restore the signal. For example, in a serial communication channel, a receiver may have a clock-and-data recovery (CDR) circuitry, which may receive an analog data stream and provide a digital binary stream, as well as recover a clock signal. A CDR system may include a decision feedback equalizer (DFE), which may generate signal corrections based on previously recovered signals. An unrolled implementation of a DFE may employ multiple branches, each one implementing a finite impulse response (FIR) filter with speculative coefficients. Unrolled implementations of filters and equalizers may be used to facilitate implementation high data rate circuitry with low or extremely low latency paths that uses previously decoded data as feedback.

In the fractional rate receivers, and in unrolled filters, multiple samplers and/or branches may be used to process (e.g., equalize) the data in parallel. Differences between the components in each of the samplers and/or branches may lead to mismatches that may affect the sensitivity of the data link. The present application discusses systems and methods for implementation of multi-sampler receivers that may be calibrated in a manner that mitigates the impact of the mismatches and improve the quality of the decoding process. The methods and systems may include configurable samplers and input amplifiers that may be used during calibration, and routines for performing the calibration employing the devices.

The embodiments described herein may, among other things, improve the capacity of the receiver circuit to distinguish between signal levels and/or improve the link sensitivity. Electronic devices that may benefit from such systems include, but are not limited to, processors, controllers, memory devices, programmable logic devices, and field programmable gate arrays, as well as any device that may implement or benefit from serial or parallel communication. Examples of protocols that may benefit from the embodiments described include, but are not limited to Ethernet protocols, WiFi protocols, Bluetooth, Universal Serial Bus (USB), Firewire, high definition media interface (HDMI), and Peripheral Component Interconnect Express (PCIe).

With the foregoing in mind FIG. 1 illustrates a receiver 100 that may include an analog front end 101 and a DFE 102. The receiver 100 may receive an input signal 104, which may be received in the analog front end 101. The analog front end 101 may have a variable gain amplifier (VGA) 106 and a continuous time linear equalizer (CTLE) 107. The VGA 106 may receive from the CTLE 107 an analog signal 108. The receiver 100 may provide a digital output 110, produced in the DFE 102.

The DFE 102 may be an unrolled implementation of a finite input response (FIR) filter. The illustrated DFE 102 may use a 1st order FIR, as illustrated. In some embodiments, a higher order FIR may be used. The DFE 102 may have two speculative branches, branch 112 and branch 114. Both branches 112 and 114 may receive an internal signal 116 from the VGA 106. The signal 116 may be received, in branch 112, at the summer 118, which may combine the signal 116 with a tap weight 119 (e.g., a tap signal). The tap weight 119 may be multiplied by a speculative coefficient 123. The summer 118 may provide a first speculative signal 121 to the sampler 120. The sampler 120 may produce a speculative digital signal 122 (e.g., a filtered signal) to a multiplexer 124 or any selection circuitry based on the first speculative signal 121.

The signal 116 may also be received, in branch 114, at the summer 128 that performs an equalization based on the tap weight 119 and a second speculative coefficient 133. The summer 128 may provide a second speculative signal 131 (e.g., a filtered signal) to the sampler 130. The sampler 130 may produce a second speculative digital signal 132 to the multiplexer 124. The multiplexer 124 may select between the first speculative digital signal 122 and the second speculative digital signal 132 based on a signal received from a feedback selector 134. The feedback selector 134 may store the previously decoded bit (e.g., previously decoded signal) from the digital output 110. Accordingly, the multiplexer 124 may select the speculative digital signal 122 from the first branch 112 when the signal from the feedback selector 134 indicates that the previously decoded bit is associated with the speculative coefficient 123 and select the speculative digital signal 132 from the second branch 114 when the signal from the feedback selector 134 indicates that the previously decoded bit is associated with the speculative coefficient 133.

Different components in branches 112 and 114 may present differences in their electrical characteristics, even if they have similar nominal specifications. For example, summers 118 and 128 may present mismatches, such as differences in gain. Similarly, samplers 120 and 130 may present mismatches. Therefore, the FIR in the first branch 112 may be slightly different from the FIR in the second branch 114, even though they have the same nominal specification. This difference in the actual implementations may impact the link sensitivity. Such differences may be ignored during the start-up routines, when the tap weight 119 may be zero and as a result, mismatches between summers 118 and 128 are not observed. When the tap weight 119 becomes a non-zero value, the mismatch between summers 118 and 128 may begin to impact the output signal generation. Such problems from mismatches between summers 118 and 128 may be more severe in high-loss channels, when the stable value for the tap weight 119 may become large.

A calibration process for the branches, detailed below, may be used to identify and/or adjust correction offsets 144 and 146 that may be applied to samplers 120 and 130, respectively. The correction offsets 144 and 146 may be used to compensate mismatches between filter elements in the branches, such as the ones discussed above. A correction offset may be a value stored in a sampler that adjusts a threshold used to determine binary values (e.g., logic values) from an analog signal. In some embodiments, the correction offset may be a bias value (e.g., a DC gain) introduced to the signal. To facilitate the calibration process, a front-end offset 148 may be added to the VGA 106. The use of the VGA 106, or more generally the use of analog front end 101, may reduce the amount of additional hardware used to perform the calibration process, as the analog front-end circuitry is common to all branches of the decoder (e.g., DFE 102).

Figure 2A:
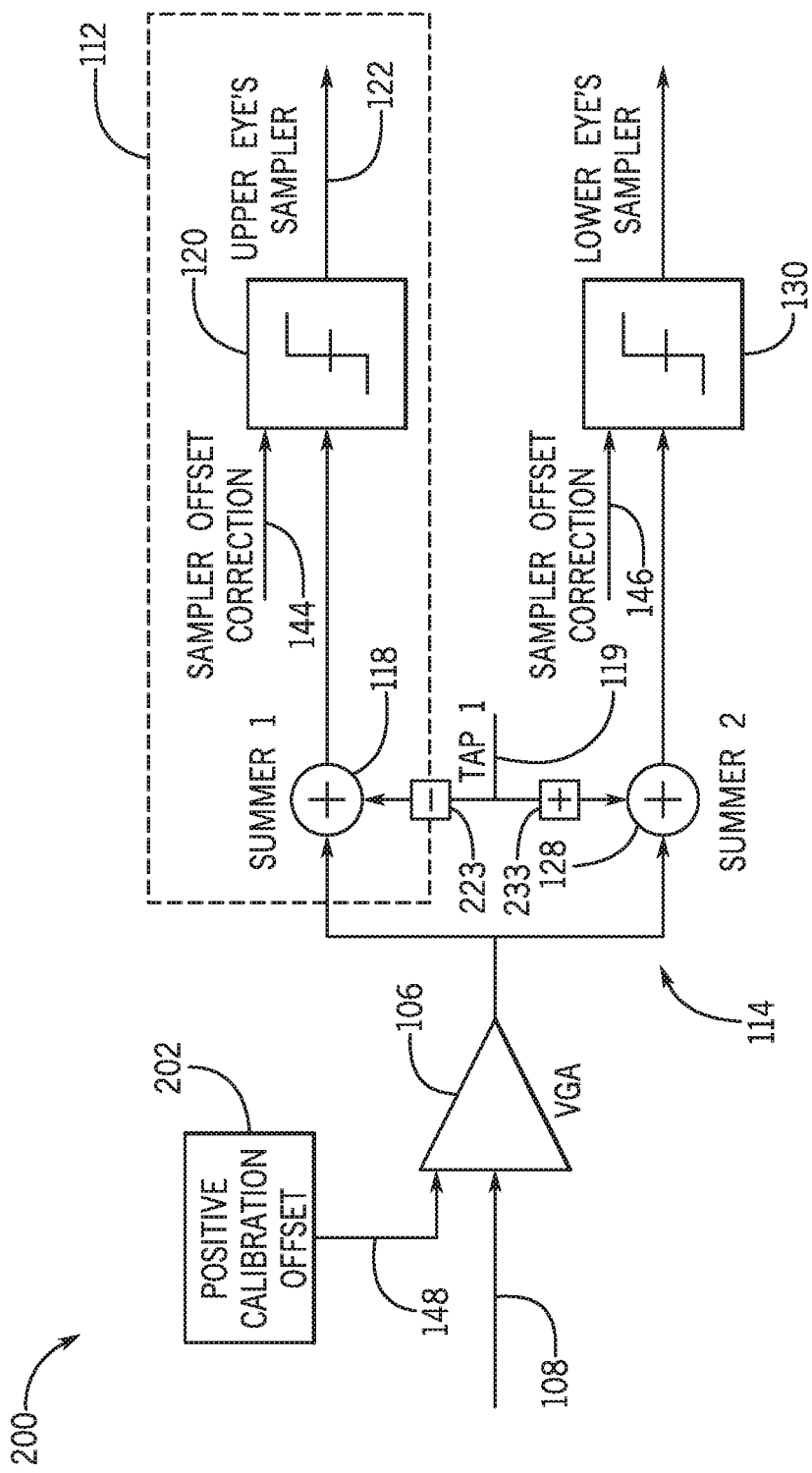
FIG. 2A is a diagram that illustrates the calibration process of the first branch of the DFE with multiple samplers of FIG. 1.
Figure 2B:
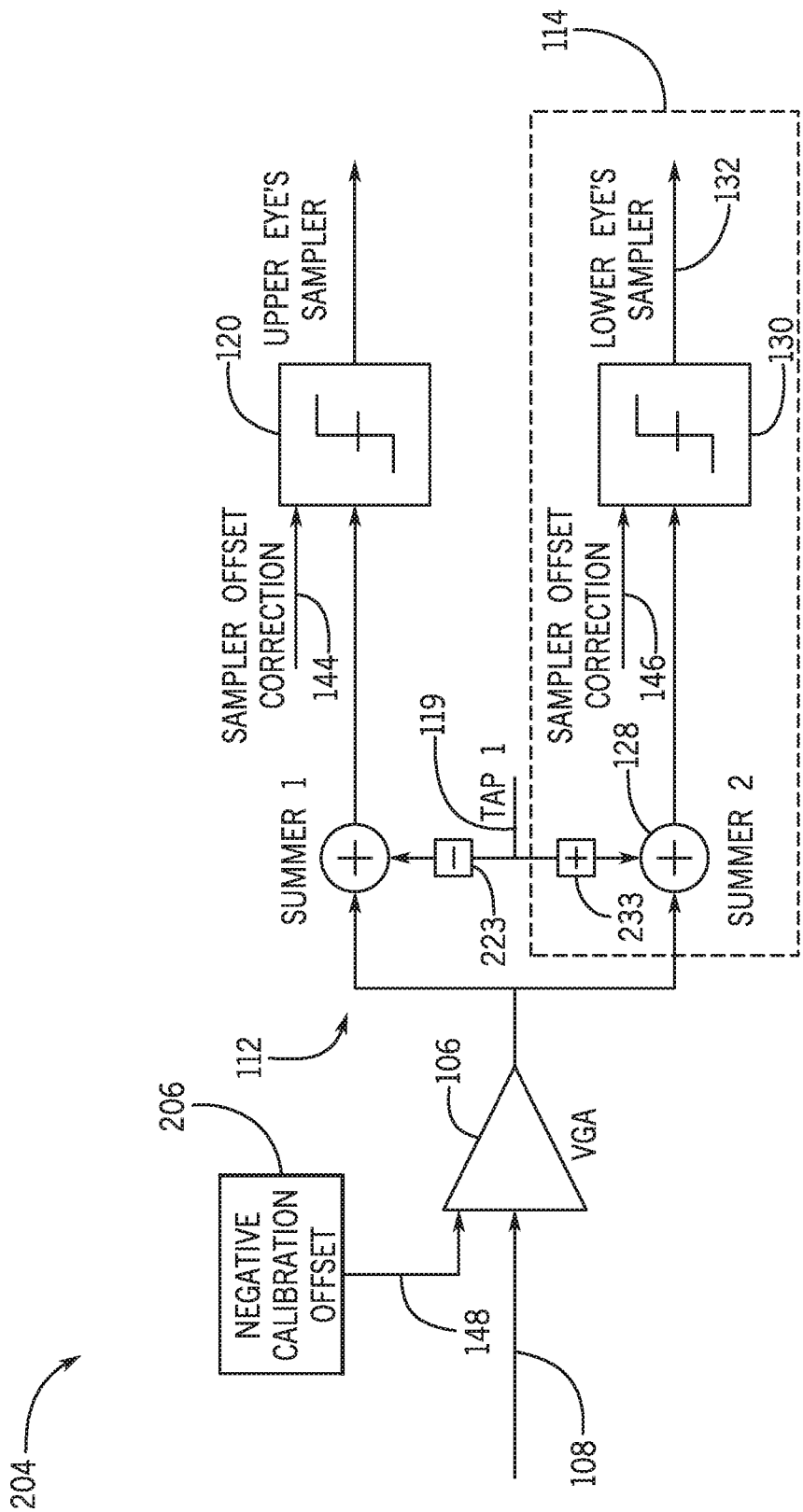
FIG. 2B is a diagram that illustrates the calibration process for the second branch of the DFE with multiple samplers of FIG. 1.

The steps 200 in FIG. 2A and 204 in FIG. 2B illustrate a calibration process to compensate the mismatches discussed above. Elements illustrated in FIGS. 2A and 2B that represent similar structures and/or may perform the same functions as in FIG. 1 may have the same element number. The calibration process illustrated in FIGS. 2A and 2B may take place after an initial start-up setup of samplers 120 and 130 so that they may provide stable values for the calibration. During the step 200, illustrated in FIG. 2A, the first branch 112 is tested. First branch 112 may be associated with a negative speculative coefficient 123 (e.g., −1 or false). During this test, a positive calibration offset 202 is applied as the front-end offset 148 to the VGA 106. The positive calibration offset 202 may be a saturating offset. A sweep of values for the tap weight 119 may be performed, and the value of the digital signal 122 may be monitored. The sweep of values may identify a crossover value for tap weight 119. For example, if the sweep is performed over an increasing sequence of tap weights 119 (e.g., from 0 to highest value), the first speculative signal 121 may decrease in each iteration of the sweep. As a result, the speculative digital signal 122 may initially be a first value (e.g., +1 or true) and, at a crossover value for tap weight 119, the speculative digital signal 122 may change to a second value (e.g., −1 or false).

During the step 204 illustrated in FIG. 2B, the second branch 114 is tested. The second branch 114 may be associated with a positive speculative coefficient 133 (e.g., +1 or true). During this test, a negative calibration offset 206 may be applied as the front-end offset 148 to the VGA 106. The negative calibration offset 206 may be saturating. A sweep of tap weight 119 value and monitoring of the speculative digital signal 132 may be performed to identify a crossover value, in a manner similar to that described in FIG. 2A. Based on the crossover values identified during steps 200 and 204, the sampler correction offsets 144 and 146 may be adjusted.

Figure 3:
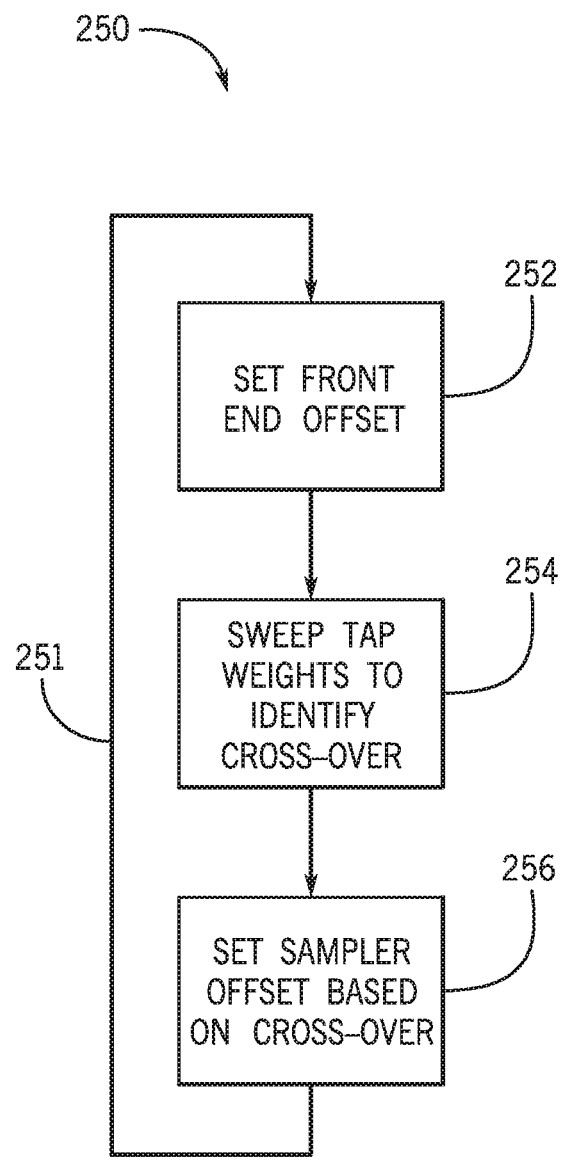
FIG. 3 is a flow chart for a method of calibration of a receiver and/or a decoder with multiple samplers, in accordance with an embodiment.

While the method illustrated in FIGS. 2A and 2B is described in the context of a speculative unrolled DFE, the calibration methods and processes described herein may be implemented in any multi-sampler circuitry. A flow chart in FIG. 3 illustrates a method 250 for calibrating sampler correction offsets in a multi-sampler and/or multi-branch decoders and/or filters in the receiver circuitry. Method 250 may be performed following an initial setup of the samplers, such that the reads provided by the samplers are reliable. Method 250 may be performed iteratively, and each iteration 251 may be associated with one branch. In each iteration 251, a front-end offset signal may be introduced in a process 252. The offset signal introduced in the front-end may be a signal that emphasizes mismatches between the branches. For example, a saturating positive signal or a saturating negative signal may be used to test a negative coefficient branch or a positive branch of an unrolled FIR, respectively. In implementations in which the tap coefficient is equally applied to all branches, such as the fractional-rate receivers detailed below, a fixed offset may be used for all branches.

In a process 254, a sweep of the tap weights may be performed to identify a crossover tap value. A sweep of the tap weights may be a monotonic sequence of values for the tap weight, which may be an increasing sequence or a decreasing sequence. The crossover tap value may be the tap weight at or around which the output value of the sample is modified. In a process 256, an offset for the sampler may be adjusted.

In some embodiments, the offset for a sampler of a branch may be based on the crossover tap value determined for that branch. For example, the sampler offset may be adjusted as proportional to the crossover tap value identified in the sweep.

In some embodiments, the offset for a sampler may be based on the previously determined crossover tap values of previous iterations 251. For example, the sampler offset may be adjusted based on a difference between the crossover tap value identified in the previous iterations 251, and the crossover tap value identified in the present iteration 251. The correction offsets in the samplers may be determined automatically based on an evaluation of a function (e.g., a mathematical function) or based on consulting a stored look-up table that uses the crossover values and/or crossover differences as an input. Once all the iterations 251 are performed for all branches, the calibration process may terminate. In certain embodiments, the calibration may be performed multiple times for each branch, to decrease the error margin in the determination of the crossover values It should be noted that the method 250 may be performed by electronic devices as a part of a start-up routine and/or during operation of the electronic device. For example, an electronic device may perform calibration of the receivers periodically and/or when a receiver raises an error condition. The method 250 may be implemented as a series of instructions performed by a processor (e.g., a computer program) coupled to the receivers, and stored in a memory communicatively coupled to the processor. The method 250 may be implemented as a dedicated logic for the receiver in an application specific integrated circuit (ASIC). The method 250 may also be implemented as a hard intellectual property (IP) or soft IP logic that controls a receiver in a programmable logic device or a field programmable gate array (FPGA). Processors, ASIC logic, FPGAs, and/or programmable logic devices may be described herein as processing circuitry.

It should be further noted that while the embodiments described herein discuss compensation of differences between summer circuitries in different branches of a receiver, the method 250 may be used for compensations of any filter element (e.g., a multiplier, an FIR) that is replicated in the multiple branches and may receive a configurable input similar to the tap weight.

Figure 4:
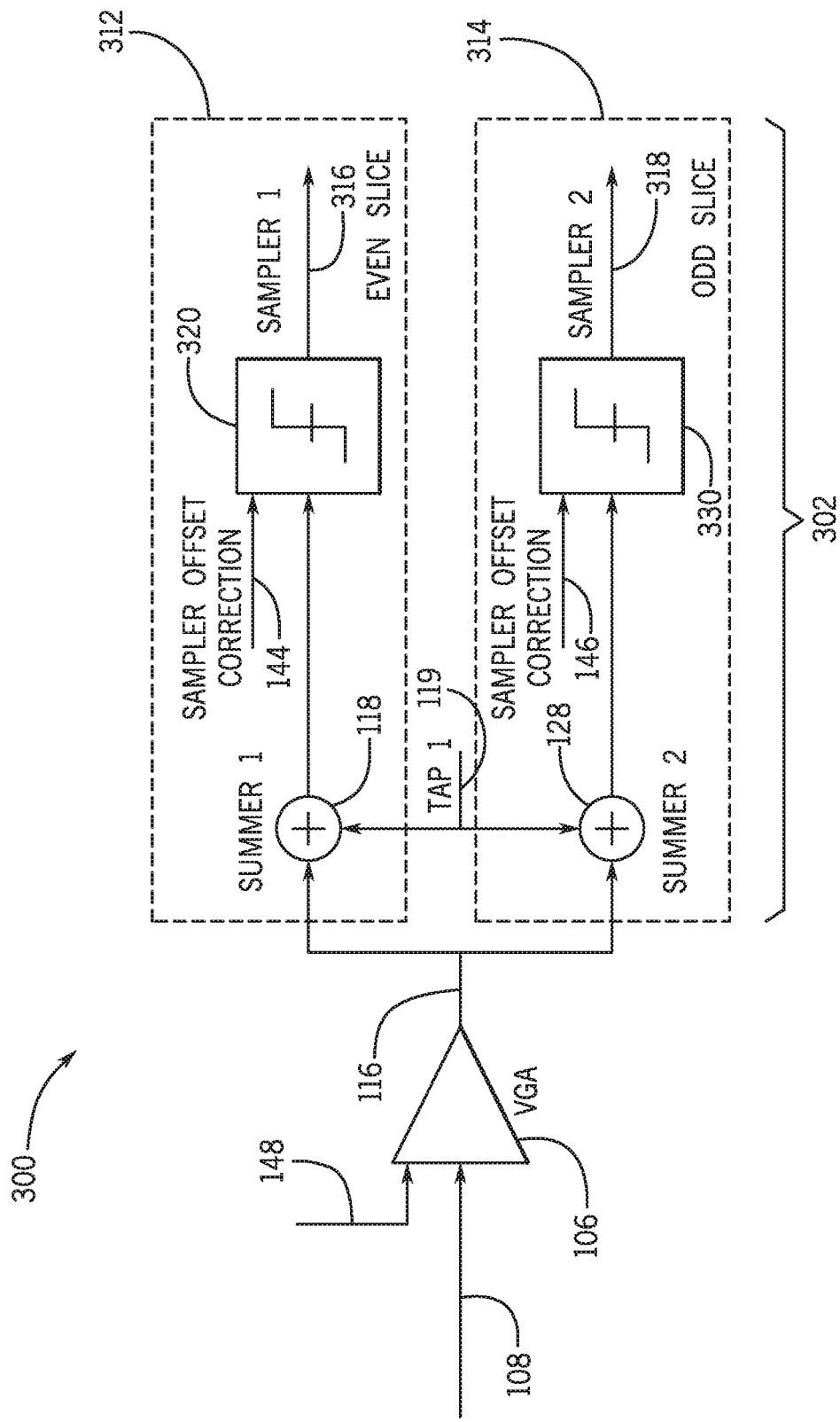
FIG. 4 is a diagram that illustrates a half-rate receiver with calibration circuitry, in accordance with an embodiment.

As discussed above, multi-branch circuitry may be used in fractional rate receivers. Receiver circuitry 300 of FIG. 4 illustrates half-rate sampler 302. Receiver circuitry may include a VGA 106 that may receive an analog signal 108 at full rate. The VGA 106 may also be arranged to receive a front-end offset 148 that may be used during calibration, as discussed above. The VGA 106 may produce a signal 116 that may be provided to branches 312 and 314. Each branch may be associated with a different slice of the analog signal. Branch 312 may produce the even bits 316 of the analog signal 108 and branch 314 may produce the odd bits 318 of the analog signal 108. To that end, samplers 320 and 330, of branches 312 and 314, respectively, may operate at half-rate (i.e., half the rate of the data rate of the analog signal 108). It should be noted that samplers 320 and 330 may be triggered in different phases (e.g., a 180° phase difference) of the clock cycle, to produce the even bits 316 and the odd bits 318, respectively.

The even slice branch 312 may include a summer 118 that may be different from the summer 128 of the odd slice branch 314. As a result, the common tap weight 119 in the half-rate sampler 302 may lead to different outputs in the summers 118 and 128. The calibration method 250, described in FIG. 3, may be applied to adjust the correction offsets 144 and 146 in the samplers 320 and 330, respectively, to compensate for differences between summers 118 and 128. The method 250 may be applied following an initial setup of correction offsets 144 and 146 that cause the samplers 320 and 330 to provide a reliable result (e.g., with tap weight 119 set to zero).

An application of method 250, using a fixed front-end offset 148, may be applied to identify tap weight crossover values for in branches 312 and 314. The difference between the crossover values in branches 312 and 314 may be used to determine correction offsets 144 and 146. For example, in situations where the summer 118 and 128 are substantially similar, the crossover values are substantially similar as well, and little or no adjustment to correction offsets 144 and/or 146 may be applied. By contrast, in situations where the summers 118 and 128 are different, compensatory adjustments to correction offsets 144 and/or 146 may be applied to improve data recovery. The adjustment in the correction offsets 144 and/or 146 may be performed to mitigate the mismatches between branches 312 and 314 when a non-zero tap weight is applied. That is, correction offsets 144 and/or 146 are chosen such that, for a given tap weight 119, samplers 320 and 330 would provide the same, or substantially similar, output bits 316 and 318 in response to a same signal 116, if the samplers 320 and 330 were set to be triggered without a phase difference. As discussed above, adjustments to correction offsets may be determined automatically by the calibration program.

Figure 5:
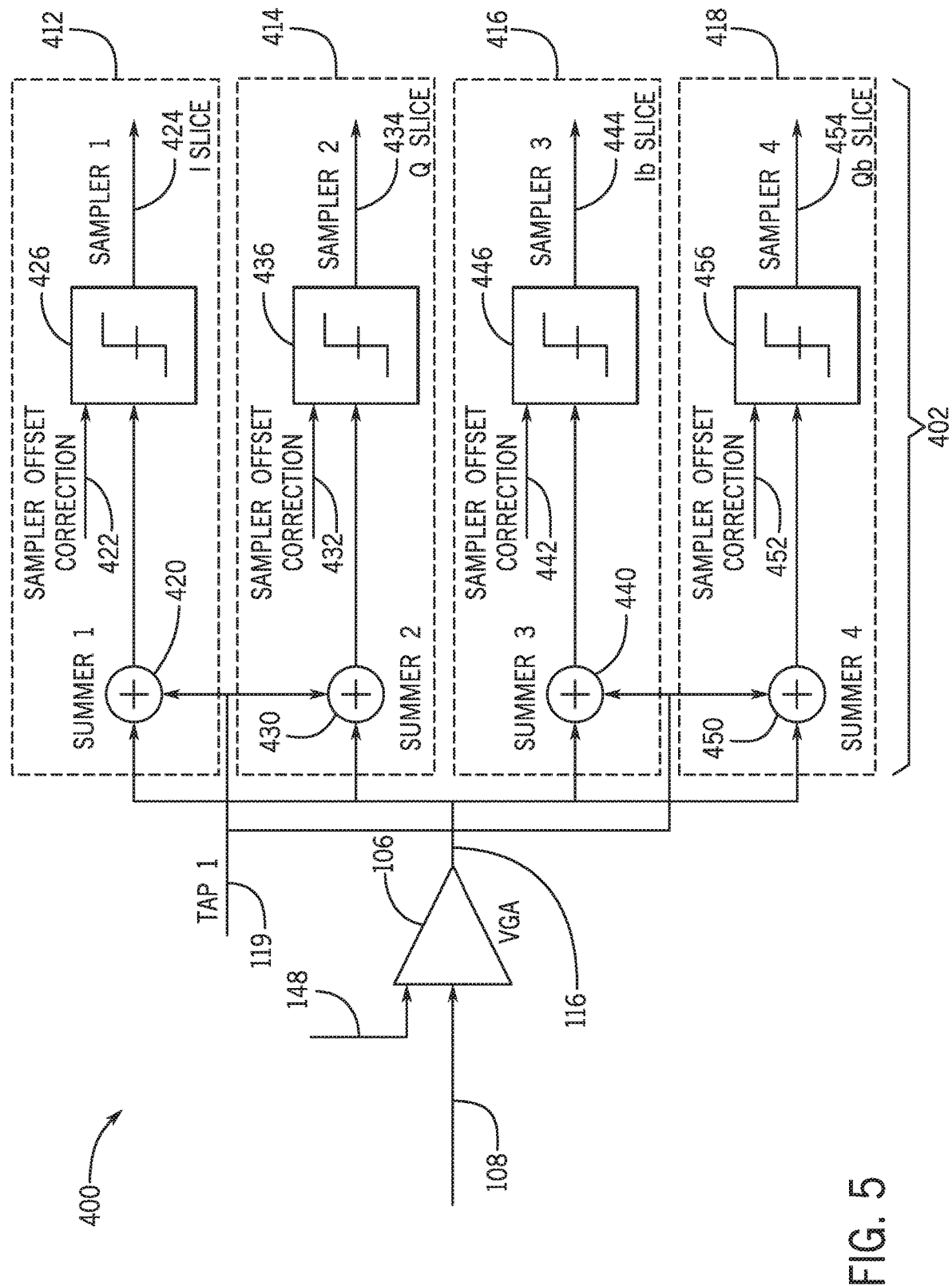
FIG. 5 is a diagram that illustrates a quarter-rate receiver with calibration circuitry, in accordance with an embodiment.

The fractional-rate receiver circuitry 400 of FIG. 5 employs a quarter-rate sampler 402. The receiver circuitry may include a VGA 106 that may receive an analog signal 108 at full rate. The VGA 106 may also be arranged to receive a front-end offset 148 that may be used during calibration, as discussed above. The VGA 106 may produce a signal 116 that may be provided to the four branches 412, 414, 416, and 418. Each branch may be associated with a different sliced of the analog signal. For example, branch 412 may produce bits 424 of a first slice (e.g., I slice), branch 414 may produce bits 434 of a second slice (e.g., Q slice), branch 416 may produce bits 444 of a third slice (e.g., Ib slice), and branch 418 may produce bits 454 of a fourth slice (e.g., Qb slice). To that end, sampler 426, 436, 446, and 456, of branches 412, 414, 416, and 418, respectively, may operate at a quarter-rate (i.e., a quarter of the data rate of the analog signal 108). It should be noted that samplers 426, 436, 446, and 456 may be triggered in different phases (e.g., in quadrature, with a 90° phase difference between consecutive slices) of the clock cycle, to sample, respectively, the bits 424, 434, 444, and 454.

Each of the branches may have a respective summer. Branch 412 may have a summer 420, branch 414 may have a summer 430, branch 416 may have a summer 440, and branch 418 may have a summer 450. As discussed above, the summers may have unintentional differences due to natural variability in electrical devices. The calibration method 250, described in FIG. 3, may be used to adjust correction offsets 422, 432, 442, and 452 for samplers 426, 436, 446, and 456, respectively. Method 250 may be applied following an initial setup of the correction offsets 422, 432, 442, and 452 without interference from summers 420, 430, 440, and 450 (e.g., with tap weight 119 set to zero) to obtain reliable sampler readings.

As with the half-rate sampler 302 of FIG. 4, a fixed front-end offset 148 may be applied to identify crossover values for tap weights in branches 412, 414, 416, and 418. Differences in the crossover values may be compensated by adjustment of the correction offsets, as discussed in FIG. 3. The adjustment in the correction offsets 422, 432, 442, and 452 may be chosen such that, for a non-zero common tap weight 119, the samplers 426, 436, 446, and 456 receive substantially the same signal from summers 420, 430, 440, and 450, respectively. As discussed above, adjustments to correction offsets may be determined automatically by the calibration routine.

Figure 6:
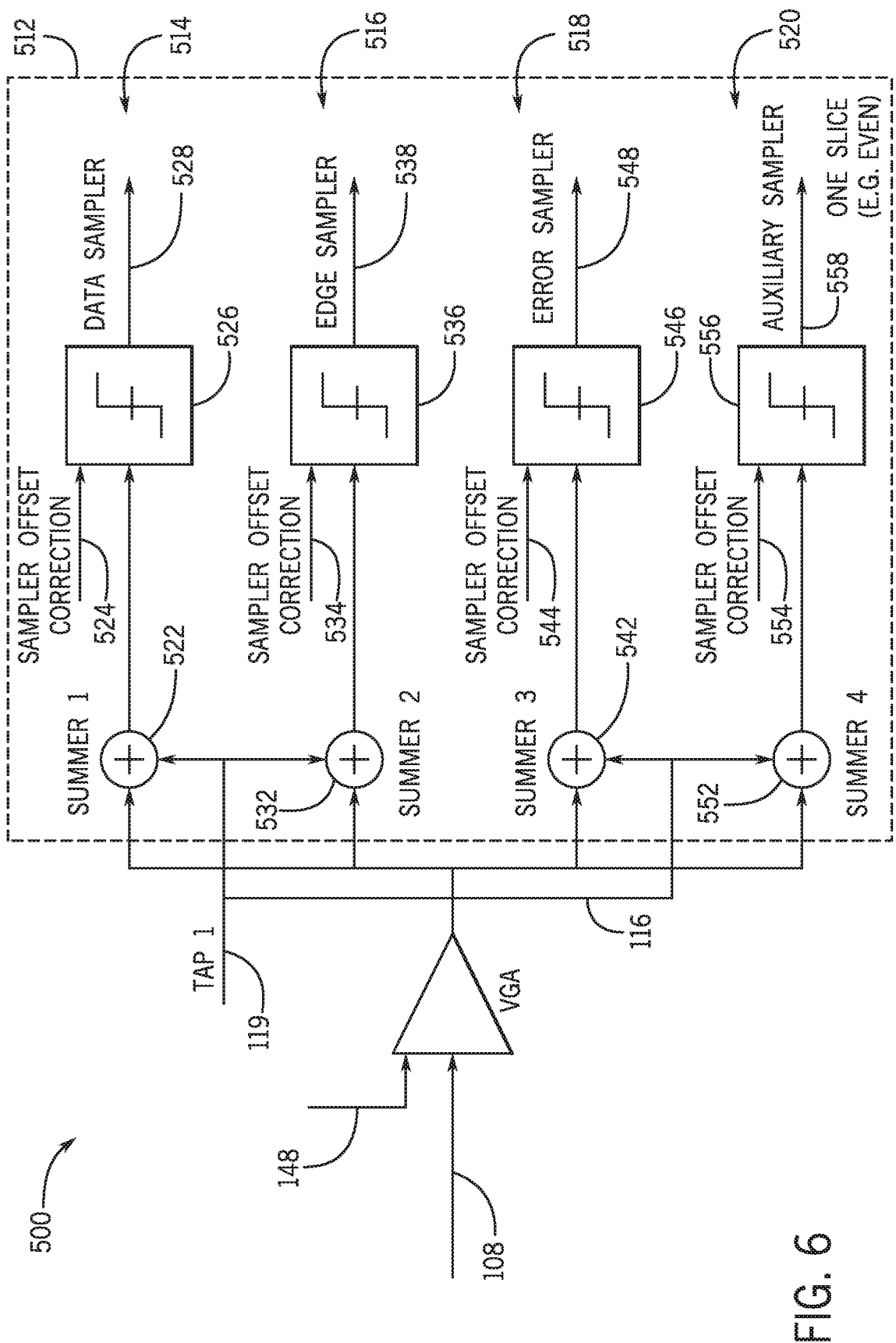
FIG. 6 is a diagram that illustrates a system with multiple samplers and calibration circuitry, and that may be used to capture features of an analog signal, in accordance with an embodiment.

The fractional-rate receiver circuitry 500 of FIG. 6 employs a feature sampler 512. The feature sampler may generate bits based on samplers that detect features from the analog signal 108. The receiver circuitry may include a VGA 106 that may receive the analog signal 108. The VGA 106 may also be arranged to receive a front-end offset 148 that may be used during calibration, as discussed above. The VGA 106 may produce a signal 116 that may be provided to branches 514, 516, 518, and 520.

Each branch may detect a different feature of the analog signal 108. For example, branch 514 may produce bits 528 based on the value of the signal (e.g., logical '0' when the sampled signal is low and logical '1' when the sample signal is high). The branch 516 may produce bits 538 based on detecting the presence of an edge (e.g., logical '0' in the presence of a falling edge or during absence of any edge, logical '1' in the presence of a rising edge). The branch 518 may produce bits 548 based on an error condition (e.g., logical '0' when no error condition is observed, logical '1' when an error condition is observed). The branch 520 may produce bits 558 based on an auxiliary sampler, which may be redundant with the other samplers, or may perform any additional sampling operation on an analog signal.

Each of the branches may have a respective summer. Branch 514 may have a summer 522, branch 516 may have a summer 532, branch 518 may have a summer 542, and branch 520 may have a summer 552. As discussed above, the summers may have unintentional differences due to natural variability in electrical devices. The calibration method 250, described in FIG. 3, may be used to adjust correction offsets 524, 534, 544, and 554 for samplers 526, 536, 546, and 556, respectively. The method 250 may be applied following an initial setup of the correction offsets 524, 534, 544, and 554 without interference from summers 522, 532, 542, and 552 (e.g., with tap weight 119 set to zero) to obtain reliable sampler readings.

During method 250, a fixed front-end offset 148 may be applied to identify crossover values for tap weights in branches 514, 516, 518, and 520, to detect differences in the crossover values. In some embodiments, the correction offsets may be adjusted to compensate for differences between the summers, as discussed in FIG. 3. In such system, the adjustment in the correction offsets 524, 534, 544, and 554 may be chosen such that, for a given tap weight 119, the samplers 526, 536, 546, and 556 receive substantially the same signal from summers 420, 430, 440, and 450, respectively. In some embodiments, the correction offsets 524, 534, 544, and 554 may be chosen to optimize the function of the branches. As discussed above, adjustments to correction offsets may be determined automatically by the calibration routine.

Figure 8:
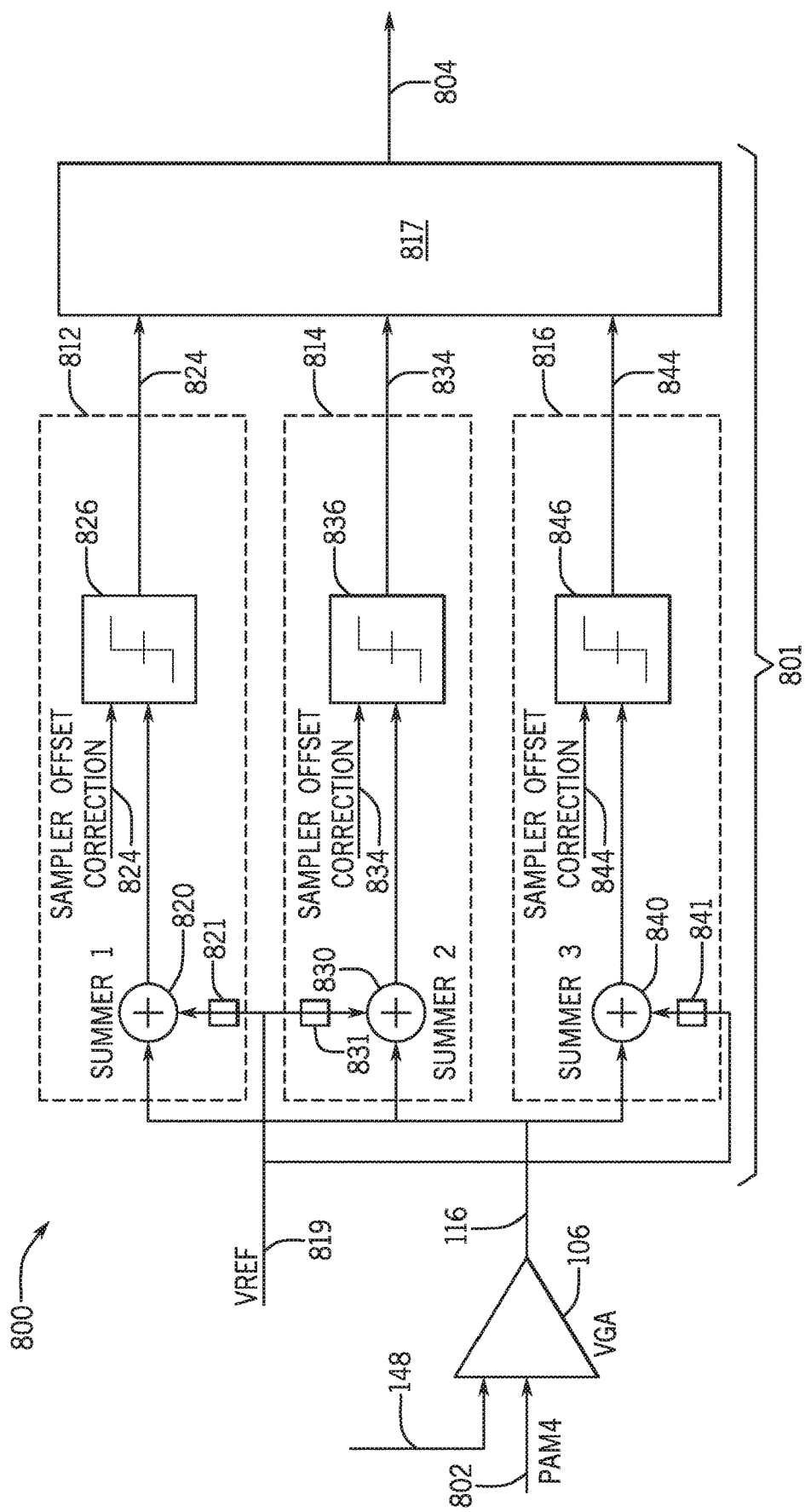
FIG. 8 is a diagram of receiver circuitry having a 4-level pulse amplitude modulation (PAM-4) decoder with multiple samplers and calibration circuitry, in accordance with an embodiment.

As discussed above, multi-branch circuitry may be used in multi-level receivers. The multilevel receiver circuitry 800 of FIG. 8 may be include a 4-level pulse-amplitude modulation (PAM-4) decoder 801 that employ multiple branches and multiple samplers. The PAM-4 decoder 801 sampler may generate bits based on the different eye openings that may be identified in the PAM-4 signal 802 to produce a binary data stream 804. The receiver circuitry 800 may include a VGA 106 that may receive the analog PAM-4 signal 802. The VGA 106 may also be arranged to receive a front-end offset 148 that may be used during calibration, as discussed above. The VGA 106 may produce a signal 116 that may be provided to branches 812, 814, and 816. Each branch may also receive an input reference voltage 819 that may be used to decode the multiple voltage levels of the PAM-4 signal 802.

Each branch may detect a different level of the PAM-4 signal 802. For example, branch 812 may produce bits 824 based on the signal 116 in reference to a first level (e.g., logical '0' when the sampled signal is below +VREF and logical '1' when the sample signal is above +VREF). To that end, the input reference voltage 819 may be set by a coefficient 821 (e.g., coefficient −1) and added to the signal 116 in a summer 820, prior to the sampling in sampler 826. The branch 814 may produce bits 834 based on the signal 116 in reference to a second voltage level (e.g., logical '0' when the sampled signal is below 0 and logical '1' when the sample signal is above 0). To that end, the input reference voltage 819 may be multiplied by a coefficient 831 (e.g., coefficient 0) and added to the signal 116 in a summer 830, prior to the sampling in sampler 836. The branch 816 may produce bits 844 based on the signal 116 in reference to a third voltage level (e.g., logical '0' when the sampled signal is below −VREF and logical '1' when the sample signal is above −VREF). To that end, the input reference voltage 819 may be multiplied by a coefficient 841 (e.g., coefficient +1) and added to the signal 116 in a summer 840, prior to the sampling in sampler 846. A decoder 817 (e.g., a ternary to binary decoder) may receive the bits 824, 834, and 844, and produce the binary stream 804 according to the PAM-4 encoding rules.

As noted above, each of the branches may have a respective summer. Branch 812 may have a summer 820, branch 814 may have a summer 830, and branch 816 may have a summer 840. As discussed above, the summers may have unintentional differences due to natural variability in electrical devices. The calibration method 250, described in FIG. 3, may be used to adjust correction offsets 824, 834, and 844 for samplers 826, 836, and 846, respectively. The method 250 may be applied following an initial setup of the correction offsets 824, 834, and 844 without interference from summers 820, 830, and 840 (e.g., with input reference voltage 819 set to zero) to obtain reliable sampler readings.

During method 250, a fixed front-end offset 148 may be applied to identify crossover values for tap weights in branches 812, 814, and 816, to detect differences in the crossover values. In some embodiments, the correction offsets may be adjusted to compensate for differences between the summers, as discussed in FIG. 3. In such system, the adjustment in the correction offsets 824, 834, and 844 may be chosen such that, for a given input reference voltage 819, the samplers 826, 836, and 846 receive a signal from adequately corrected in summers 820, 830, and 840, respectively. As discussed above, adjustments to correction offsets may be determined automatically by the calibration routine.

In the embodiments described above, the front-end offset 148 is described as added in the variable gain amplifier of the front-end circuitry. However, it should be noted that the intentional front-end offset used during calibration may be applied to any stage of the front-end. It should also be noted that, while the compensation described above is implemented using sampler offsets, the compensation may be added through dedicated voltage and/or current digital-to-analog converters (DACs) added to the receiver circuitry. The dedicated DACs may be programmed based on the measured difference in crossover tap values.

Figure 7:
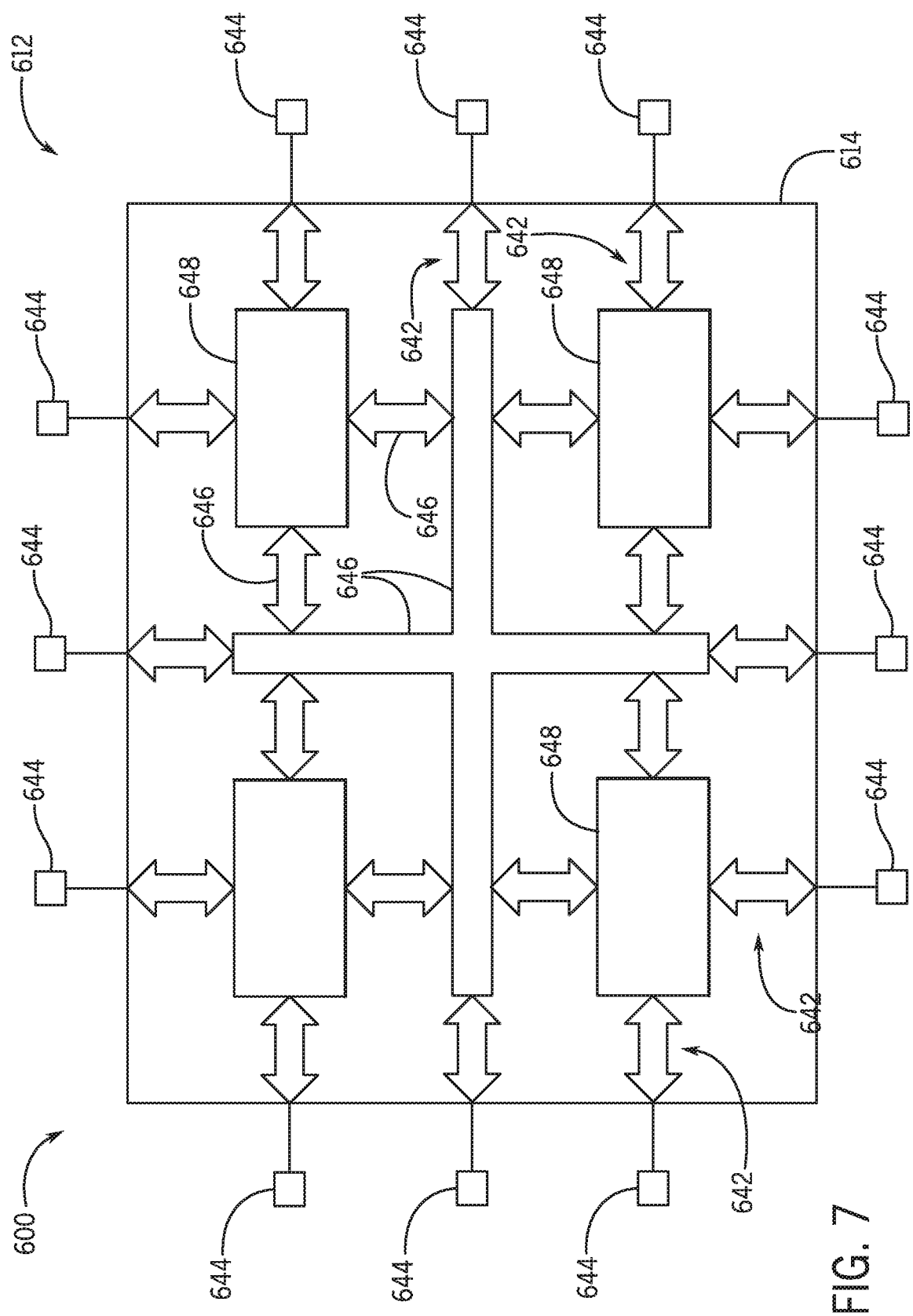
FIG. 7 is a diagram that illustrates an electronic device that may employ the receivers and/or decoders with calibration circuitry, in accordance with an embodiment.

The receivers with the calibration circuitry described above may be used by electronic devices to establish communication channels. One such system is the electronic device 612 illustrated in FIG. 7. The electronic device 612 may have an integrated circuit device 614, which may be a programmable logic device, such as a field-programmable gate array (FPGA), as illustrated. The integrated circuit device 614 may also be a processor device, a system on chip, a mother board containing a processor and a memory, a hybrid processor having a processor with programmable fabric, or any device that may benefit from transceivers. As illustrated, the integrated circuit device 614 may have input/output circuitry 642, for driving signals off device and for receiving signals from other devices via input/output pins 644. The input/output circuitry 642 may include any of the receivers illustrated above and, in some embodiments, the receivers may be programmed in any of the above-described configurations. The integrated circuit device 614 may also include interconnect resources 646, such as conductive lines, traces (e.g., printed circuit board traces), and/or data buses that may be used to route signals within the integrated circuit device 614 and with the input/output circuitry 642. Logic blocks 648, which may include processing units, programmable logic, application specific integrated circuitry, memory devices, etc., may be directly connected with the input/output circuitry 642 and/or the interconnect resources 646.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. An electronic device comprising a receiver that comprises:
    front-end circuitry configured to amplify an input signal to provide an internal signal, wherein the front-end circuitry is configured to receive a front-end offset;
    a first branch comprising a first summer configured to receive the internal signal and a tap signal and to provide a first filtered signal, and a first sampler configured to receive the first filtered signal, wherein the first sampler is configured to receive a first correction offset value;
    a second branch comprising a second summer configured to receive the internal signal and the tap signal and to provide a second filtered signal, and a second sampler configured to receive the second filtered signal, wherein the second sampler is configured to receive a second correction offset value; and
    processing circuitry configured to perform a calibration process, wherein the calibration process comprises:
        setting the front-end offset to a first value;
        determining a first crossover tap value that changes a first output of the first sampler, wherein the first crossover tap value is determined based at least in part on a first sweep of values;
        determining a second crossover tap value that changes a second output of the second sampler, wherein the second crossover tap value is determined based at least in part on a second sweep of values; and
        adjusting the first correction offset value and the second correction offset value based, at least in part, on the first crossover tap value and the second crossover tap value.

2. The electronic device of claim 1, wherein the receiver comprises a decision feedback equalizer (DFE) that comprises the first branch and the second branch comprising a multiplexer configured to receive a first digital signal from the first sampler and a second digital signal from the second sampler.

3. The electronic device of claim 2, wherein the tap signal is multiplied by a positive coefficient in the first branch, and the tap signal is multiplied by a negative coefficient in the second branch of the DFE.

4. The electronic device of claim 1, wherein the receiver comprises a multi-level pulse amplitude modulation (PAM-N) receiver, and wherein the tap signal comprises a reference voltage signal.

5. The electronic device of claim 4, wherein the PAM-N receiver comprises a PAM-4 receiver.

6. The electronic device of claim 1, comprising a half-rate receiver that comprises the first branch and the second branch, wherein the input signal comprises a first data rate, and wherein the first sampler and the second sampler operate at half of the first data rate.

7. The electronic device of claim 1, wherein the processing circuitry comprises a processor, a field programmable gate array, or an application specific integrated circuit, or any combination thereof.

8. The electronic device of claim 1, wherein the adjustment of the first correction offset value and the second correction offset value performed by the processing circuitry is configured to compensate for a difference between the first summer and the second summer.

9. The electronic device of claim 1, wherein the front-end circuitry comprises a continuous time linear equalizer, a variable gain amplifier, or both.

10. A decoding system comprising:
an input amplifier configured to receive an input signal and a front-end offset signal, and to provide an internal signal;
a plurality of branches, wherein each respective branch comprises a respective filter element configured to receive the internal signal and a respective sampler configured to receive a respective filtered signal from the respective filter element, wherein each filter element of each branch is configured to receive a common signal, and wherein each respective sampler is configured to receive a respective offset correction value; and
processing circuitry configured to perform a calibration by:
setting the front-end offset to a first value;
for each respective branch of the plurality of branches, determining a respective crossover value for the common signal that changes an output of the respective sampler, wherein the respective crossover value is determined based at least in part on a sweep of values; and
for each respective branch of the plurality of branches, adjusting the respective offset correction value based at least in part on the respective crossover value.

11. The decoding system of claim 10, comprising a decision feedback equalizer (DFE) that comprises the plurality of branches, and wherein the common signal comprises a common tap signal.

12. The decoding system of claim 10, comprising a fractional-rate receiver that comprises the plurality of branches.

13. The decoding system of claim 12, wherein the fractional-rate receiver comprises a quarter-rate receiver, and the plurality of branches comprises four branches.

14. The decoding system of claim 10, wherein the plurality of branches comprise a first branch configured to sample a value of the input signal, a second branch configured to sample an edge of the input signal, and a third branch configured to detect an error in the input signal.

15. The decoding system of claim 10, wherein the adjustment of the respective offset correction value is configured to compensate for differences between the filter elements of the plurality of branches.

16. The decoding system of claim 10, comprising a 4-level pulse amplitude modulation (PAM-4) decoder.

17. A method to calibrate a receiver, comprising:
setting a front-end offset for an amplifier in front-end circuitry to a first value, wherein the front-end offset is combined with an input signal to provide an internal signal;
determining a first crossover value for a first branch, wherein the first branch comprises a first summer configured to receive the internal signal and a tap signal, and a first sampler configured to receive a first filtered signal from the first summer, wherein the first crossover value is the tap signal that is configured to change a first output of the first sampler, and wherein the first crossover value is determined based at least in part on a first sweep of values;
determining a second crossover value for a second branch, wherein the second branch comprises a second summer configured to receive the internal signal and the tap signal, and a second sampler configured to receive a second filtered signal from the second summer, wherein the second crossover value is the tap signal that is configured to change a second output of the second sampler, and wherein the second crossover value is determined based at least in part on a second sweep of values; and
setting a first offset value for the first sampler and a second offset value for the second sampler based at least in part on a difference between the first crossover value and the second crossover value.

18. The method of claim 17, wherein the first value comprises a positive saturating offset, and wherein the method comprises setting the front-end offset to a second value that comprises a negative saturating offset.

19. The method of claim 17, wherein setting the first offset value for the first sampler and setting the second offset value for the second sampler is configured to compensate for differences between the first summer and the second summer.

20. The method of claim 17, wherein the first offset value and the second offset value are calculated using a look-up table or a function.

* * * * *